United States Patent
Jiang et al.

(10) Patent No.: US 11,224,906 B2
(45) Date of Patent: Jan. 18, 2022

(54) REMEDIATION MATERIAL FOR HEAVY-METAL CHROMIUM CONTAMINATED SOIL, PREPARATION METHOD AND APPLICATION THEREOF

(71) Applicant: CHINESE RESEARCH ACADEMY OF ENVIRONMENTAL SCIENCES, Beijing (CN)

(72) Inventors: Yonghai Jiang, Beijing (CN); Beidou Xi, Beijing (CN); Zhifei Ma, Beijing (CN); Yu Yang, Beijing (CN); Xinying Lian, Beijing (CN); Fu Xia, Beijing (CN); Xu Han, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 468 days.

(21) Appl. No.: 16/168,385

(22) Filed: Oct. 23, 2018

(65) Prior Publication Data
US 2019/0126332 A1    May 2, 2019

(30) Foreign Application Priority Data
Oct. 31, 2017    (CN) .......................... 201711044026.6

(51) Int. Cl.
*B09C 1/08* (2006.01)
*B01J 20/02* (2006.01)
*B01J 20/12* (2006.01)
*B01J 20/30* (2006.01)
*B01J 20/28* (2006.01)
*B01J 20/06* (2006.01)

(52) U.S. Cl.
CPC ............. *B09C 1/08* (2013.01); *B01J 20/0229* (2013.01); *B01J 20/06* (2013.01); *B01J 20/12* (2013.01); *B01J 20/2803* (2013.01); *B01J 20/28004* (2013.01); *B01J 20/28009* (2013.01); *B01J 20/28054* (2013.01); *B01J 20/28085* (2013.01); *B01J 20/3028* (2013.01); *B01J 20/3042* (2013.01); *B01J 2220/42* (2013.01)

(58) Field of Classification Search
CPC ......... B09C 1/08; B01J 20/0229; B01J 20/06; B01J 20/12; B01J 20/28004; B01J 20/28009; B01J 20/2803; B01J 20/28054; B01J 20/28085; B01J 20/3028; B01J 20/3042; B01J 2220/42
USPC ......................................................... 588/407
See application file for complete search history.

(56) References Cited

U.S. PATENT DOCUMENTS

| | | | | |
|---|---|---|---|---|
| 4,251,255 A | * | 2/1981 | Wagner | C09K 17/18 71/27 |
| 2019/0270067 A1 | * | 9/2019 | Wang | B01J 20/10 |

* cited by examiner

*Primary Examiner* — Edward M Johnson
(74) *Attorney, Agent, or Firm* — Seed IP Law Group LLP

(57) ABSTRACT

Described herein is a soil remediation material capable of absorbing and removing chromium from soil and being recycled so as to enable efficient remediation, repeated recycle, and reduction in remediation cost.

7 Claims, No Drawings

REMEDIATION MATERIAL FOR HEAVY-METAL CHROMIUM CONTAMINATED SOIL, PREPARATION METHOD AND APPLICATION THEREOF

TECHNICAL FIELD

The present invention relates to the field of contaminated soil remediation technology, in particular to a remediation material for heavy-metal chromium contaminated soil.

The present invention further relates to a method of preparing the above remediation material for heavy-metal chromium contaminated soil.

The present invention further relates to a method of removing heavy-metal chromium from soil using the above remediation material.

BACKGROUND

At present, the problem of heavy-metal contaminating soil in China is very prominent, especially, a large amount of chromium (Cr) contaminated sites seriously harm human health. Chromium generally has two valence states in the environment, namely, trivalent chromium and hexavalent chromium. Hexavalent chromium is more toxic and mobile than trivalent chromium in the environment. For remediation of chromium, hexavalent chromium, which is high toxic, is generally converted into trivalent chromium, which results in reduction in mobility and toxicity. However, the remedied chromium in soil achieved by this method is easily reoxidized back to hexavalent chromium under certain conditions, so there is uncertainty in remediation of chromium in actual environment. In fact, chromium exists in the environment in an inorganic form and its total amount cannot be reduced by final mineralization. Now, methods that can effectively reduce the total amount of heavy metal contaminating sites mainly include leaching technology, soil mixing method, and phytoremediation technology.

The soil leaching technology mainly uses surfactants and water or other materials to leach contaminated soil and desorb chromium adsorbed on the surface of soil particles. However, there exist problems such as heavy workload in the process of remediation, poor desorption effect and subsequent leacheate treatment.

The soil mixing method can only reduce the concentration of heavy metal in the site to some extent, but cannot reduce its total amount. At the same time, this method will increase the total amount of contaminated soil.

Phytoremediation technology is a currently recommended technical method. It is mainly used for agricultural land, and has problems such as long remediation period, difficult screening of plants, and subsequent plant disposal.

Therefore, how to effectively achieve the removal of chromium from soil will become one of key tasks for contaminated soil remediation.

At present, the main purpose of heavy metal remediation is to reduce the total amount and to avoid secondary contamination. The selection and development of remediation materials is an important part for remediation of heavy metal contaminated soil. Proper remediation materials can effectively remove heavy metal contamination, and can be also effectively recovery and recycled. In fact, the remediation material in the soil can be recycled once it is used. Especially for heavy metal adsorption materials, they are not suitable for application in soil media.

SUMMARY

An object of the present invention is to provide a remediation material for heavy-metal chromium contaminated soil.

Another object of the present invention is to provide a method for preparing the above-mentioned remediation material for heavy-metal chromium contaminated soil.

In order to realize the above object, the remediation material for heavy-metal chromium contaminated soil provided in the present invention comprises: 10-30% by weight of stable curable adhesive, 30-50% by weight of composite adsorbent, and water in balance.

The remediation material above mentioned has a particle size of 0.3-1 mm and a porosity of 30-38%.

In the above mentioned remediation material for heavy-metal chromium contaminated soil, the stable curable adhesive is a mixture of cement, fine sand and sodium alginate in a mass ratio of 1:0.1-0.3:0.6-1.2.

In the above mentioned remediation material for heavy-metal chromium contaminated soil, the composite adsorbent is a mixture of $Fe_3O_4$, attapulgite, sepiolite and $FePO_4$ in a mass ratio of 0.8-1:1-1.4:0.5-0.7:0.8-1; wherein $Fe_3O_4$ has a particle size of 0.05-0.5 mm, and the attapulgite has a specific gravity of 2.05-2.32 and a particle size of 0.1-0.5 mm.

The method of preparing the remediation material for heavy-metal chromium contaminated soil provided in the present invention comprises steps of:

1) uniformly mixing cement, fine sand, and sodium alginate in a mass ratio of 1:0.1-0.3:0.6-1.2 in a dry environment so as to form a stable curable adhesive;

2) grinding $Fe_3O_4$, attapulgite, sepiolite and $FePO_4$ in a mass ratio of 0.8-1:1-1.4:0.5-0.7:0.8-1 so as to form a composite adsorbent; and 3) pelleting with 10-30% by weight of stable curable adhesive, 30-40% by weight of composite adsorbent, and water in balance, and naturally drying so as to obtain the remediation material for heavy-metal chromium contaminated soil.

In the above mentioned method, the composite adsorbent in step 2) is ground in a ball mill having a rotation speed of 400 r·min$^{-1}$ and running alternately in forward and reverse directions every 60 minutes for total 15-20 h.

In the above mentioned method, the pelleting in step 3) is performed by a pelletizer.

The method of removing heavy metal chromium from soil using the remediation material for heavy metal chromium contaminated soil provided in the present invention comprises the steps of:

excavating soil of a heavy chromium contaminated site and mixing with the remediation material for heavy-metal chromium contaminated soil uniformly, desorbing and removing chromium from soil particles under the absorption of the composite adsorbent, placing the stirred and mixed soil on an inclined magnetic absorption plate, absorbing the remediation material for heavy-metal chromium contaminated soil onto the magnetic absorption plate for recycle; or adding the remediating material for heavy-metal chromium contaminated soil to low contamination farmland, flood irrigating the farmland and retaining water therein, plowing soil continuously using a cultivator, and finally mounting a magnetic absorption plate onto the cultivator to absorb the material in the soil for removing heavy metal.

The present invention has the following advantages:

(1) the remediation material of the present invention coats $Fe_3O_4$ particles with attapulgite so that chromium is absorbed by attapulgite in an effective manner, and then attapulgite is separated from soil particles under absorption of magnetic $Fe_3O_4$, avoiding subsequent disposal of wastewater produced from traditional soil leaching;

(2) the remediation material of the present invention can be recycled through desorption of adsorbed chromium so as to reduce remediation cost; and (3) the main components of the remediation material of the present invention are prepared by synthetizing natural minerals, and the soil will not be contaminated once again in practical remediation process.

DETAILED DESCRIPTION

The remediation material for heavy-metal chromium contaminated soil provided in the present invention comprises: 10-30% by weight of stable curable adhesive, 30-50% by weight of composite adsorbent, and water in balance, and has a particle size of 0.3-1 mm and a porosity of 30-38%.

Its preparation method comprises:

1) uniformly mixing cement, fine sand, and sodium alginate in a mass ratio of 1:0.1-0.3:0.6-1.2 in a dry environment so as to form a stable curable adhesive;

2) placing $Fe_3O_4$, attapulgite, sepiolite and $FePO_4$ in a mass ratio of 0.8-1:1-1.4:0.5-0.7:0.8-1 into a planetary ball mill for grinding so as to form a composite adsorbent, the ball mill having a rotation speed of 400 $r \cdot min^{-1}$ and running alternately in forward and reverse directions every 60 minutes for total 15-20 h; and 3) pelleting with 10-30% by weight of the stable curable adhesive, 30-40% by weight of the composite adsorbent, and water in balance, and naturally drying pelleted microspheres so as to obtain the required material.

The following different methods may be adopted according to levels of soil contamination as a method of removing heavy metal chromium from soil using the remediation material for heavy metal chromium contaminated soil in the present invention:

1) regarding heavy contaminated sites with the content of chromium being five times higher than the standard value as stipulated in *Soil Environment Quality Standard*, excavating contaminated soil and mixing with the remediation material for heavy-metal chromium contaminated soil, stirring fully and uniformly in a stirrer, desorbing and removing chromium from soil particles under the absorption of the composite adsorbent, placing the stirred and mixed soil on an inclined magnetic absorption plate, absorbing the remediation material for heavy-metal chromium contaminated soil onto the magnetic absorption plate for recycle;

2) regarding low contaminated farmlands with the content of chromium being five times lower than the standard value as stipulated in *Soil Environment Quality Standard*, adding the prepared remediation material for heavy metal chromium contaminated soil to the contaminated farmland, flood irrigating the farmland and retaining water therein, plowing soil continuously using a cultivator, and finally mounting a magnetic absorption plate onto the cultivator to absorb the material in the soil for removing heavy metal.

The invention proposes using the compound action of stable curable adhesive, composite adsorbent and water to realize functions of remedying chromium in the soil efficiently and stably, being suitable for fieldwork, and helping to increase the effectiveness of chromium adsorption. Moreover, $Fe_3O_4$ is coated with attapulgite and then pelleted in combination with stable curable adhesive to efficiently separate the prepared material from the soil so as to achieve the purpose of removing chromium from the soil, and further enable the remediation material to have characteristics of environmental protection and low cost.

EXAMPLE

Mix cement, fine sand and sodium alginate uniformly in a mass ratio of 0.8:0.1-0.2:0.6-1.2 and formulate into stable curable adhesive for later use. Weigh 100 g of $Fe_3O_4$, 140 g of attapulgite, 50 g of sepiolite, and 80 g of $FePO_4$ and add them to a planetary ball mill for ball milling, which runs at a rotation speed of 400 $r \cdot min^{-1}$ and runs alternately in forward and reverse directions every 60 minutes for total 15-20 h so as to obtain a composite adsorbent for use.

Take 150 g of the stable curable adhesive and 290 g of the composite adsorbent to mix fully and uniformly. Spray a certain amount of water to make the mixture wet. Put the mixture into extrusion-spheronization pelletizer for pelleting, and set the extrusion speed to be 100 r/min. Place the extrusion material under natural ventilation conditions to dry so as to obtain a desired material. Measure the material, wherein pellets with a particle size of 1.0 mm accounts for 85%, and its porosity is 30-38%.

Collect contaminated soil from a chromium contaminated site in Qinghai Province, containing 1785 mg/kg of chromium. Take 1 kg of soil. Add thereto 100 mg of developed material that above prepared to stir mechanically for 3 h, then recycle the material by magnetic absorption. Final detection shows the total concentration of chromium is 500 mg/L, and the removal rate is as high as 72%.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to Chinese Patent Application No. 201711044026.6, filed Oct. 31, 2017, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A remediation material for heavy-metal chromium contaminated soil, the remediation material comprising: 10-30% by weight of stable curable adhesive, 30-50% by weight of composite adsorbent, and water in balance,
    wherein the composite adsorbent is a mixture of $Fe_3O_4$, attapulgite, sepiolite and $FePO_4$ in a mass ratio of 0.8-1:1-1.4:0.5-0.7:0.8-1,
    wherein $Fe_3O_4$ has a particle size of 0.05-0.5 mm, and the attapulgite has a specific gravity of 2.05-2.32 and a particle size of 0.1-0.5 mm.

2. The remediation material for heavy-metal chromium contaminated soil according to claim 1, wherein the remediation material for heavy-metal chromium contaminated soil has a particle size of 0.3-1 mm and a porosity of 30-38%.

3. The remediation material for heavy-metal chromium contaminated soil according to claim 1, wherein the stable curable adhesive is a mixture of cement, fine sand and sodium alginate in a mass ratio of 1:0.1-0.3:0.6-1.2.

4. A method of preparing the remediation material for heavy-metal chromium contaminated soil according to claim 1, comprising steps of:
1) uniformly mixing cement, fine sand, and sodium alginate in a mass ratio of 1:0.1-0.3:0.6-1.2 in a dry environment so as to form a stable curable adhesive;
2) grinding $Fe_3O_4$, attapulgite, sepiolite and $FePO_4$ in a mass ratio of 0.8-1:1-1.4:0.5-0.7:0.8-1 so as to form a composite adsorbent, wherein $Fe_3O_4$ has a particle size of 0.05-0.5 mm, and the attapulgite has a specific gravity of 2.05-2.32 and a particle size of 0.1-0.5 mm; and
3) pelleting with 10-30% by weight of stable curable adhesive, 30-40% by weight of composite adsorbent, and water in balance, and naturally drying so as to obtain the remediation material for heavy-metal chromium contaminated soil.

5. The method according to claim 4, wherein the composite adsorbent in step 2) is ground in a planetary ball mill having a rotation speed of 400 $r \cdot min^{-1}$ and running alternately in forward and reverse directions every 60 minutes for total 15-20 h.

6. The method according to claim 4, wherein the pelleting in step 3) is performed by a pelletizer.

7. A method of removing heavy metal chromium from soil using the remediation material for heavy metal chromium contaminated soil according to claim 1, comprising:
excavating soil of a heavy chromium contaminated site and mixing it with the remediation material for heavy-metal chromium contaminated soil uniformly, desorbing and removing chromium from soil particles under the absorption of the composite adsorbent, placing the stirred and mixed soil on an inclined magnetic absorption plate, absorbing the remediation material for heavy-metal chromium contaminated soil onto the magnetic absorption plate for recycle, or
adding the remediating material for heavy-metal chromium contaminated soil to low contaminated farmland, flood irrigating the farmland and retaining water therein, plowing soil continuously using a cultivator, and finally mounting a magnetic absorption plate on the cultivator to absorb the material in the soil for removing heavy metal.

\* \* \* \* \*